(12) United States Patent
Bertrand et al.

(10) Patent No.: US 8,932,660 B2
(45) Date of Patent: Jan. 13, 2015

(54) GELATIN SUBSTITUTE PRODUCT AND USES IN FOOD PREPARATION

(75) Inventors: Philippe Bertrand, Bailly (FR); Philippe Marand, Plaisir (FR)

(73) Assignee: Barry Callebaut AG, Zurich (CH)

( * ) Notice: Subject to any disclaimer, the term of this patent is extended or adjusted under 35 U.S.C. 154(b) by 1735 days.

(21) Appl. No.: 10/521,579

(22) PCT Filed: Jul. 15, 2003

(86) PCT No.: PCT/FR03/02239
§ 371 (c)(1),
(2), (4) Date: May 4, 2005

(87) PCT Pub. No.: WO2004/008882
PCT Pub. Date: Jan. 29, 2004

(65) Prior Publication Data
US 2005/0220967 A1    Oct. 6, 2005

(30) Foreign Application Priority Data

Jul. 18, 2002    (FR) .................................... 02/09155

(51) Int. Cl.
| | | |
|---|---|---|
| *A23G 1/00* | (2006.01) | |
| *A23D 9/00* | (2006.01) | |
| *A23L 1/30* | (2006.01) | |
| *A21D 2/16* | (2006.01) | |
| *A23G 3/34* | (2006.01) | |
| *A23L 1/00* | (2006.01) | |
| *A23L 1/052* | (2006.01) | |
| *A23L 1/16* | (2006.01) | |
| *A23L 1/212* | (2006.01) | |

(52) U.S. Cl.
CPC ................. *A23L 1/3006* (2013.01); *A23G 1/80* (2013.01); *A23G 1/0009* (2013.01); *A21D 2/16* (2013.01); *A23G 1/002* (2013.01); *A23G 1/0023* (2013.01); *A23G 3/346* (2013.01); *A23G 2200/08* (2013.01); *A23L 1/0097* (2013.01); *A23L 1/052* (2013.01); *A23L 1/16* (2013.01); *A23L 1/2128* (2013.01); *A23V 2002/00* (2013.01)
USPC ........................................... 426/631; 426/601

(58) Field of Classification Search
CPC .......... A23G 1/00; A23G 1/0009; A23G 1/30
USPC .................................................. 426/601, 631
See application file for complete search history.

(56) References Cited

U.S. PATENT DOCUMENTS

| | | | | |
|---|---|---|---|---|
| 2,203,643 | A | | 6/1940 | Musher |
| 4,098,913 | A | * | 7/1978 | Baugher ....................... 426/104 |
| 4,363,824 | A | * | 12/1982 | Willi et al. ................... 426/589 |
| 5,460,847 | A | * | 10/1995 | Kawabata et al. ............ 426/631 |
| 5,968,583 | A | * | 10/1999 | Gautchier et al. ............ 426/572 |

FOREIGN PATENT DOCUMENTS

| | | | |
|---|---|---|---|
| EP | 0029153 | | 5/1981 |
| EP | 393963 A2 | * | 10/1990 |
| EP | 564787 A2 | * | 10/1993 |
| EP | 1369041 A1 | * | 12/2003 |
| WO | WO 89/02223 | | 3/1989 |
| WO | WO 98/13133 | * | 9/1997 |
| WO | WO 00/11966 | * | 6/1999 |
| WO | WO 99/46036 | | 9/1999 |
| WO | WO 01/60867 | | 8/2001 |

OTHER PUBLICATIONS

Pires, Murilo, Gelatine Replacers an Industry Searches for Alternatives, 15(2) Food Marketing and Technology at pp. 7-8 (Apr. 2001); ISSN 0932-2744.

* cited by examiner

*Primary Examiner* — Jyoti Chawla
(74) *Attorney, Agent, or Firm* — Hoxie & Associates LLC

(57) ABSTRACT

The invention relates to a gelatin substitution product, characterized in that it contains essentially a vegetable fat, in particular in that it contains essentially cocoa butter.
Application to the production of culinary confectionery preparations.

5 Claims, 1 Drawing Sheet

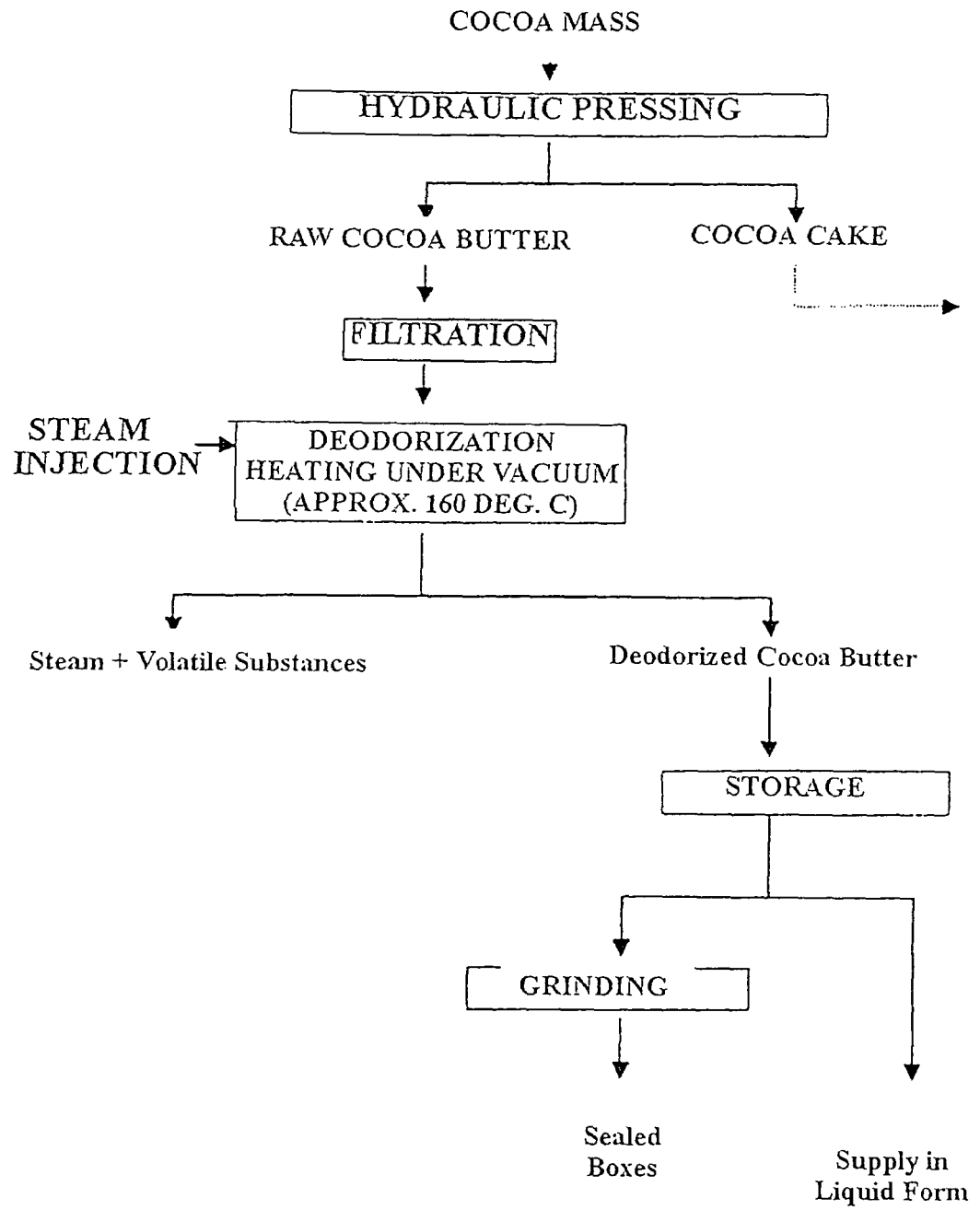

GELATIN SUBSTITUTE PRODUCT AND USES IN FOOD PREPARATION

This application claims priority under 35 U.S.C. §§119, 271, and 365 to International Patent Application No. PCT/FR2003/002239, filed Jul. 15, 2003, which claims priority to French Patent Application No. FR02/09155, filed Jul. 18, 2002.

The present invention relates to a gelatin substitution product and its applications, in particular in the field of foods.

After the emergence of bovine spongiform encephalopathy, utilization of gelatin in culinary preparations continues to be controversial. In addition, the inventors, pastry professionals, have noted that gelatin especially has the following drawbacks: certain types of gelatin have a flavor; moreover, the desired solidified product often has a rubbery texture; in addition, the pastry chef's work area definitively and directly influences the microbiology of gelatin. This is in fact often manipulated with the bare hands, which poses certain hygienic problems due to its reactivity.

The work of the inventors has led them to discover a novel substitute product that responds more satisfactorily to the requirements of the consumer and which is free especially of any suspicion relative to food hygiene.

The invention thus relates to a gelatin substitute product a well as to the process for incorporating it with other ingredients for producing a culinary preparation.

More particularly, the invention proposes a gelatin substitution product characterized in that it contains essentially a vegetable fat.

"Essentially" is defined as at least 99% of vegetable fat. In particular, the substitute according to the invention can be comprised of 100% vegetable fat.

It more particularly relates to hydrogenated colza/rape seed oil, palm oil fractions and more especially cocoa butter. The preferred fats are in particular the solidified fats; that is, those fats that are solid at room temperature.

In particular, the fat materials proposed by the invention are comprised of at least 75% palmitic, stearic and oleic acids and comprise a maximum of 1% lauric acid. Preferably, the percent of the aforesaid fatty acids is at least 85%. Such proportions make it possible to assure obtaining fats having a composition approximating that of cocoa butter. As is described in the following, the composition of cocoa butter provides it with a certain number of quite specific characteristics demonstrated by the inventors and, in particular, adequate for use as a gelatin substitution product.

The fat materials according to the invention do not have gellifying properties like gelatin. In contrast, they have stabilization properties. The term "gelatin substitute" is used to mean that the product is used in identical fashion, by replacing the gelatin, according to the following method:

the cold product is introduced into the culinary preparation; the preparation being heated to a temperature greater than 60° C.

it is mixed until a uniform paste is obtained and preferably while the preparation is cooling;

it is allowed to cool to room temperature before being placed in the refrigerator.

According to another method of incorporation described below, the product can be heated to a temperature of 30 to 40° C. prior to incorporating it into the culinary preparation at this same temperature.

In contrast with gelatin, the product is not hydrated prior to incorporation. Its utilization is thus simpler. Furthermore, said gelatin hydration step was a critical step of the fabrication process because it comprised a significant risk of introduction of bacterial into the culinary preparations. In fact, gelatin is an excellent medium for bacterial development. The product according to the invention is thus also more hygienic.

The advantages of cocoa butter are numerous:

1. Flavor

The finished products comprising cocoa butter as the gelatin substitute are fresher in the mouth than those prepared using gelatin; this enhances taste, the natural flavors and the aromas of the other ingredients present in the preparation (for example, fruits in the case of a fruit mousse and crèmes, in general).

In addition, gelatin, in contrast with cocoa butter, utilizes the water of the food in order to gellify. By drying the foods in order to swell up with water, the preparations containing it become insipid.

The very good organoleptic qualities of cocoa butter as a gelatin substitute are also due to its excellent palatability (impression in the mouth). In fact, cocoa butter has a melting point at a temperature close to that of the mouth. As a result, in the mouth, the cocoa butter melts and produces a creamy taste. Such a feature originating in the specific composition of its fatty material. An excessively stearic fat produces a waxy effect in the mouth. In contrast, an excessively oleic fat produces an oily taste in the mouth. Now, cocoa butter, because of its specific composition, does not produce any of the aforementioned unpleasant effects.

Concerning the fats not having a composition approximating that of cocoa butter, J. Pontillon, in his book *Cacao et Chocolat. Production, utilisation et caractéristiques* (Lavoisier 1998) describes them as follows: "An indisputable drawback of these fats resides in the particularly unpleasant flavor that they can acquire and pass on to the product": the flavor commonly called "soapy". [ . . . ] Cocoa butter has a place of its own among the fatty materials since it can have an oleic acidity running up to 1.75% while not being a drawback to taste, because its C16 and C18 acids are neutral from this point of view. On the other hand, for the majority of the other fatty materials, particularly the refined ones, the free acid does not exceed 0.10%. This is absolutely necessary for the fats containing high quantities of lauric acid and shorter acid, because, in the free state, these acids have very pronounced tastes ranging from a soapy impression to flavors tending towards the butyric (rancid butter) the more the fatty chain is shortened. Consequently, the least introduction of lipases resulting in chain shortening results in a significant deterioration in taste.

2. Texture

Gelatin confers to the preparations a rather elastic or rubbery foam-like texture which gives the preparation an artificial characteristic. Cocoa-butter based preparations on the other hand produce a pleasantly smooth, creamy texture comparable to that of a high quality yogurt.

3. Visual Aspect

With regard to the utilization of gelatin, the cocoa-butter based substitution product makes it possible to obtain a color that is closer (more natural, authentic) to other ingredients used in the culinary preparation. The final appearance of the preparations is more brilliant.

4. Health

Cocoa butter has very good nutritional qualities without producing hypercholesterolemia.

Furthermore, with regard to the other solid fats, it does not contain fatty acids of the trans configuration. In fact, these fatty acids appear at the type of hydrogenation of fatty materials (bio-hydrogenation for the milk fat materials, partial hydrogenation for the vegetal fat materials). Now, as a result of the studies on the utilization of these fats and their impact on health, certain countries are studying legislative propositions consisting in limiting the level of these fatty acids in food products.

5. Natural Character of the Product

The gelatin substitute comprised of cocoa butter is a natural product issuing from the cocoa bean. Cocoa beans can provide good traceability. Advantageously, the substitute according to the invention is comprised of 100% cocoa butter.

In addition, cocoa butter is one of the rare vegetable fat materials that is naturally solid at room temperature. In fact, the other solid type fats are obtained by fractionating (for example, palm oil or palm kernel oil) and/or hydrogenation (palm kernel oil, copra oil). These steps require the introduction of additives or chemical products such as catalysts (e.g., Raney nickel for hydrogenation). These fats are, moreover, the cause of discoloration. Cocoa butter used as a gelatin substitute do not contain a trace of chemical reagents due to this type of transformation.

All of these advantages make cocoa butter the product of choice for use as a gelatin substitution product.

The substitute according to the invention can be incorporated very easily into mixtures. According to one preferred embodiment of the invention, the cocoa butter used as a gelatin substitute is present in the form of a powder. One such presentation makes possible an instant and uniform source of substitute as well as very precise dosing of the product. Its use is thus simple, fast and precise. The powder form of cocoa butter can be obtained, for example, by cryoengineering of cocoa butter. One such method is described in application No EP 0934110.

According to another embodiment, the substitution product according to the invention may contain additives such as lecithins and other emulsifiers, antioxidants in proportions ranging from 0 to max. 1%.

According to the applications considered, the substitution product can be deodorized to 90-95%. For example, the method described in FIG. 1 can be used. As indicated in the diagram, this step does not change the natural character of the product at all, since it comprises heating with injection of water steam.

For other applications, it would be useful to conserve the taste of the cocoa butter by initial hydraulic pressure.

In this latter instance, it is interesting to report that the undeodorized cocoa butter is more resistant to oxidation over time.

The invention also proposes a method for incorporating the substitution product according to the invention, characterized in that said product is melted at a temperature of 30 to 40° C. prior to being incorporated into the ingredients for a culinary preparation.

Alternatively and more particularly, when the substitute is present in the powder form, it can be incorporated directly into the preparation when the latter is heated to a temperature above 60° C.

Whatever the method of incorporation used, it is preferable to regularly mix the preparation during cooling in order to obtain a uniform mixture.

In the field of confectionery-catering, it is preferable that the culinary preparation has a moisture content of less than 70% prior to incorporation of the substitute according to the invention. Ideally, the moisture content should be around 40% to 50%. Such a moisture content makes it possible to obtain a preparation that is perfectly stabilized without being hard. It will be clear to the specialist in the art how to adapt his recipe by increasing the dry ingredients or the moisture content as a function of the desired hardness.

Advantageously, for fruit mousses, it is recommended that a third of the fruit pulp be heated to approximately 60-80° C. and then adding the substitute product according to the invention, mixing and then incorporating the rest of the cold pulp in order to obtain rapid cooling to room temperature. However, too rapid cooling, for example, by placing the mixture in the refrigerator, is strongly discouraged.

The quantity of substitution product will be chosen as a function of the preparation to be produced.

In particular, the cocoa butter will be advantageously incorporated with a quantity equal to two to four times the quantity by weight of gelatin usually used in the culinary preparation.

The substitution product can be used by replacing the gelatin in all kinds of culinary preparations and more particularly in the production of confections up to 180° C.

The following preparations are mentioned by way of example terrenes, fruit mousses, Bavarian crèmes, crèmes, bonbons, yogurts, dessert crèmes, lemon tarts, pastry crème for eclairs, double-crème puffs, crème puffs, flans, rice pudding, crème cheese.

It should also be noted with interest that utilization of the substitution products of the invention for making Kosher preparations.

The different aspects of the invention will be better understood from the following examples 1 to 9 given by way of illustration.

Example 1

Raspberry Mousse

| Raspberry Mousse (Cocoa Butter) | | |
|---|---|---|
| Heat to 30° C. | 300 g | Raspberry pulp |
| with | 175 g | Caster sugar |
| add | 55 g | Cocoa butter melted at 30-32° C. |
| At 30° C. add | 650 g | Whipped single cream |
| Raspberry Mousse (Gelatin) | | |
| Heat to 30° C. | 300 g | Raspberry pulp |
| with | 175 g | Caster sugar |
| add | 22 g | Hydrated gelatin sheets |
| At 30° C. add | 650 g | Whipped single cream |

The recipe is identical for obtaining strawberry, blackberry, wild strawberry, apricot, passion fruit, morello cherries, wild berry and other mousses.

Example 2

White Chocolate Satin Crème

| White Chocolate Satin Crème (Cocoa Butter) | | |
|---|---|---|
| | Make a pastry crème using | |
| | 200 g | Whole milk |
| | 20 g | Caster sugar |
| | 20 g | Crème powder |
| | 50 g | Egg yolk |
| | 1 pod | Vanilla |
| | After cooking, add | |
| | 130 g | Satin white chocolate |
| and | 10 g | Cocoa butter |
| At 30° C. add | 300 g | Whipped single cream |
| White Chocolate Satin Crème (Gelatin) | | |
| | Make a pastry crème using | |

-continued

|  | 200 g | Whole milk |
|---|---|---|
|  | 20 g | Caster sugar |
|  | 20 g | Crème powder |
|  | 50 g | Egg yolk |
|  | 1 pod | Vanilla |
|  | After cooking, add | |
|  | 130 g | Satin white chocolate |
| and | 4 g | Cocoa butter |
| At 30° C. add | 300 g | Whipped single cream |

Example 3

Praline Crème

| Praline Crème (Cocoa Butter) | | |
|---|---|---|
| Boil | 130 g | Syrup at 30° C. |
| Pour over | 100 g | Egg yolks |
| Add | 400 g | Praliné Tradition Lenôtre |
| and | 18 g | Cocoa butter |
| At 30° C. add | 530 g | Whipped single cream |
| Praline Crème (Gelatin) | | |
| Boil | 130 g | Syrup at 30° C. |
| Pour over | 100 g | Egg yolks |
| Add | 400 g | Praliné Tradition Lenôtre |
| and | 6 g | Cocoa butter |
| At 30° C. add | 530 g | Whipped single cream |

Example 4

Gianduja Mousse

| Gianduja Mousse (Cocoa Butter) | |
|---|---|
| Prepare a pastry crème using | |
| 300 g | Whole milk |
| 50 g | Egg yolks |
| 20 g | Crème powder |
| 60 g | Caster sugar |
| 16 g | Cocoa butter |
| 180 g | Gianduja Plaisir melted at 30-32° C. |
| 250 g | Whipped single cream |
| Gianduja Mousse (Gelatin) | |
| Prepare a pastry crème using | |
| 300 g | Whole milk |
| 50 g | Egg yolks |
| 20 g | Crème powder |
| 60 g | Caster sugar |
| 16 g | Cocoa butter |
| 180 g | Gianduja Plaisir melted at 30-32° C. |
| 250 g | Whipped single cream |

Example 5

Mousse for White Satin Chocolate Quenelles

| Mousse for White Satin Chocolate Quenelles (Cocoa Butter) | |
|---|---|
| Prepare a pastry crème using | |
| 200 g | Whole milk |
| 40 g | Caster sugar |
| 60 g | Egg yolks |
| 20 g | Crème powder |
| 15 g | Caster sugar |
| 1 pod | Vanilla |
| 400 g | White Satin Chocolate |
| 60 g | Cocoa butter |
| 900 g | Whipped single cream |

Example 6

Mousse using a Fruit Pulp Pastry Crème Base

| 600 g | Pulp |
|---|---|
| 150 g | Caster sugar |
| 20 g | Egg yolk |
| 55 g | Whole eggs |
| 40 g | Cocoa butter powder |
| 600 g | Whipped single cream |

Proceed as for a pastry crème using fruit pulp; add the cocoa butter, cool to 30° C., then add the Whipped single cream.

Example 7

Black Currant Mousse

| 300 g | Black currant pulp |
|---|---|
| 175 g | Caster sugar |
| 60 g | Cocoa butter powder |
| 650 g | Whipped single cream |

Heat a third of the pulp with the sugar to 70° C. add the cocoa butter. Mix well. Then add the remaining pulp at 3° C.

Cool to 18° C.; then incorporate the well whipped single cream.

The recipe can be used with blackberry pulp and cherry pulp.

Example 8

Wild Strawberry and Blackberry Bavarian Crème

| 250 g | Wild strawberry pulp |
|---|---|
| 100 g | Puréed blackberries |
| 200 g | Caster sugar |
| 60 g | Egg yolks |
| 80 g | Cocoa butter powder |
| 750 g | Whipped single cream |

Bring the wild strawberry pulp and the blackberry purée to a boil; pour it over the previously mixed sugar and the egg yolks. Cook at 85° C., strain through a chinois and add the cocoa butter; cool to 18° C. and add the well whipped single cream.

Example 9

Tart Crème and Lemon, Orange, Passion Fruit or Mandarin Orange Dessert

| | |
|---|---|
| 250 g | Pulp |
| 250 g | Caster sugar |
| 200 g | Whole eggs |
| 200 g | Egg yolks |
| 200 g | Milk butter |
| 150 g | Cocoa butter powder |

Bring the pulp to a boil; pour over the previously mixed eggs, the egg yolks and the sugar and cook at 85° C. in the microwave or the double-boiler; add the milk butter and the cocoa butter; cool.

The invention claimed is:

1. A non-gelling gelatin substitution product, consisting essentially of at least 99 weight % cocoa butter, deodorized to an extent of 90-95%, and is in the form of a powder.

2. The substitution product according to claim 1, comprising an antioxidant.

3. A method of incorporating a substitution product according to claim 1 into a culinary preparation, wherein the culinary preparation has a moisture content of 40 to 50%.

4. A method for incorporating a substitution product according to claim 1 into a culinary preparation, wherein said product is incorporated directly into the preparation when the latter is heated to a temperature greater than 60° C.

5. The method of claim 4, wherein the resulting culinary preparation comprising the substitution product is subsequently cooled to room temperature.

* * * * *

UNITED STATES PATENT AND TRADEMARK OFFICE
CERTIFICATE OF CORRECTION

PATENT NO. : 8,932,660 B2  Page 1 of 1
APPLICATION NO. : 10/521579
DATED : January 13, 2015
INVENTOR(S) : Philippe Bertrand et al.

It is certified that error appears in the above-identified patent and that said Letters Patent is hereby corrected as shown below:

In the Specification

Column 1, line 4-5, "This application claims priority under 35 U.S.C. §§119, 271, and 365 to" should be changed to --This application is a United States Application under 35 U.S.C. § 371 which claims the benefit of--.

Signed and Sealed this
Nineteenth Day of May, 2015

Michelle K. Lee
*Director of the United States Patent and Trademark Office*